July 11, 1933.   J. C. KROESEN   1,917,653
SOUND TRACK MECHANISM
Filed Nov. 7, 1931
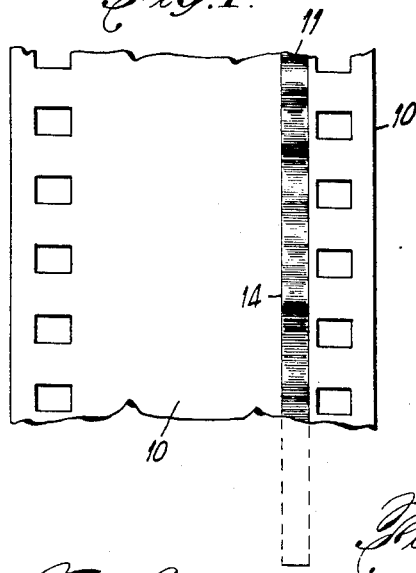
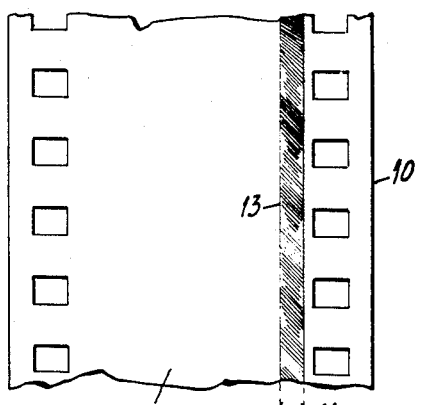
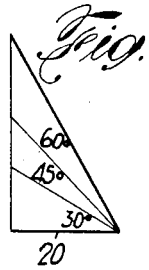
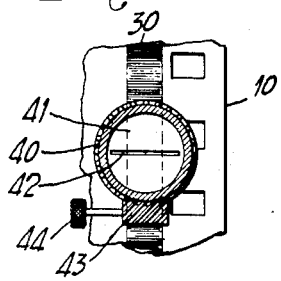
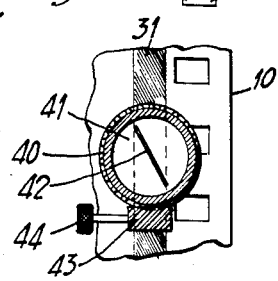
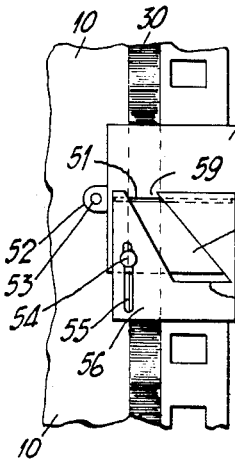
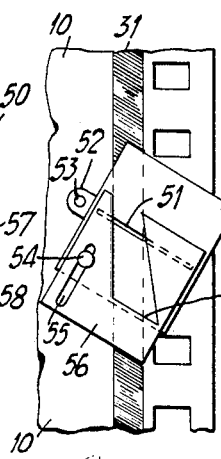
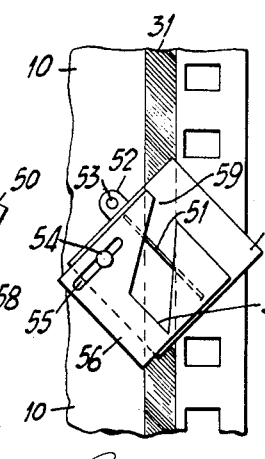
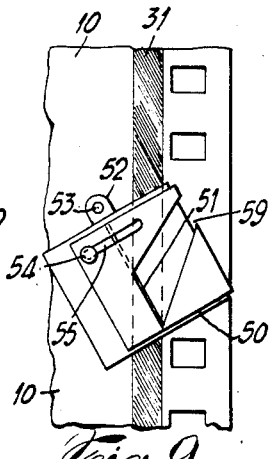
INVENTOR
JAY CLEIS. KROESEN
BY Austin Dix
ATTORNEYS Patented July 11, 1933

1,917,653

UNITED STATES PATENT OFFICE

JAY CLEIS KROESEN, OF BELLEVILLE, NEW JERSEY

SOUND TRACK MECHANISM

Application filed November 7, 1931. Serial No. 573,709.

This invention relates to improvements in apparatus and method of recording on film and more particularly to an improved sound track associated with sound films.

As is well known, various photographic processes have been utilized for recording sound on film, the fundamental concept involved in all of the processes being the variation of a light source of uniform luminosity by means of a photographed sound translated into electrical currents. Difficulty has been experienced in extending the registers of the sound cameras in that the apertures have not been of sufficient size to permit the recording of the lower bass and the upper treble notes.

In addition, present electrical sound amplifiers are not generally suited for a wide range of frequencies, thus further preventing or inhibiting adequate reproduction or recording of sound.

It is an object of this invention to provide an improved motion picture film having an improved sound track thereon.

It is another object of this invention to provide an improved motion picture film having a sound track whose components are angularly disposed with respect to the direction of travel of the film.

Yet another object of this invention is the provision of improved motion picture film having a sound track of variable width.

It is also an object of this invention to provide such improved film having a sound track of variable width adapted for use for standard 16, 25, 35, 50, and 70 millimeter films, etc.

Yet a further object of this invention is the provision of an improved sound track for motion picture films which is adapted to be consolidated so as to form a track of varying depth which is further adapted to be printed on small size tracks for standard 35 millimeter film.

A further object of this invention is the provision of an improved sound aperture mechanism for a sound camera.

Yet another object of this invention is the provision of an improved method for reproducing, recording and printing sound on film.

These and other desirable objects and advantages of the present invention will be illustrated in the accompanying drawing and described in the specifications, a certain preferred embodiment being disclosed by way of example only for, since the underlying principles may be incorporated in other specific structures, it is not intended to be limited to the ones here shown, except as such elements are clearly imposed by the appended claims.

In the drawing like numerals refer to similar parts throughout the several views, of which Fig. 1 is a fragmentary elevation of a motion picture film showing a standard sound track;

Fig. 2, a view similar to Fig. 1, shows a smaller improved sound track.

Fig. 3 is a diagrammatic representation of the relations between the standard horizontal track elements and the improved diagonal elements of the present invention.

Fig. 4 is a vertical section through an aperture mechanism showing variable control.

Fig. 5 is a view similar to Fig. 4, the aperture being shown rotated through an angle.

Figs. 6, 7, 8, and 9 are plan views of an aperture mechanism associated with a sound track on a moving picture film, the aperture being shown in various angular positions.

As intimated hereinabove difficulty has been experienced in recording and reproducing sound on film due to the fact that the physical elements of the sound tracks and associated apertures now in use are such that the possible upper and lower registers of sounds are not now capable of being reproduced.

These prior art difficulties have been overcome by the application of the novel concepts of the present invention in which the width of the sound records printed in a sound track area are appreciably increased, preferably to from 40 to 60 per cent or more in effective width.

The present invention also comprehends the use of sound tracks of variable depth, as well as those of variable width, and further comprehends the printing or transforming of sound tracks of variable width to sound tracks of variable depth.

This highly desirable result is preferably and in the broad sense accomplished by providing a sound track having its components diagonally positioned with respect to the direction of travel of the film.

A desirable angularity for the sound track elements is 45 degrees from the angle or direction of travel of the film proper, although other angles may be used.

With the improved sound arrangement herein by having the sound exposures, elements, or components at an angle to their previous horizontal positions, it will be appreciated that the width of the sound track area is increased in effect without involving any increase in the actual width of the sound track area itself.

With the sound track elements diagonally printed with respect to the direction of travel of the film, a desired increase in width of the sound track elements of up to substantially 40 per cent is obtained without necessitating any increase in width of the sound track area. While an angle of 45 degrees has been specified, it will, of course, be understood that this is given merely by way of illustration, as any angle from the horizontal may be made use of according to the circumstances in each particular case.

As will be pointed out more in detail hereinafter, and referring more particularly to Fig. 3, it will be appreciated that the angularity of the aperture from the horizontal may extend up to substantially 90 degrees.

With an angle of 45 degrees the sound track has its registers increased. Where it is desired to provide a further increase, the invention comprehends the variation of the angle of the sound track elements to take care of this feature.

A standard mechanical or optical aperture assembly or mechanism may be made use of, and such an assembly is provided with means whereby it may be rotated at will about its longitudinal axis to provide for a desirable variation in the angularity of the aperture with direction to the travel of the sound track area.

The sound cameras used for recording and reproduction, as noted, will be provided with an aperture which is adapted to be rotated about its axis so as to present apertures of varying length to correspond to the angularity of the sound track elements desired and providing such elements of a length occupying the entire available width of the sound track area.

Due to the general increase in intensity of the light passing through the aperture, which is a function of the increased area of the aperture, there is an increase in photo-electric intensity of the photo-electric cell, as the intensity changes are greater in the cell due to the greater quantity of light impinged thereon.

The intensity of sound already recorded, as well as the upper and lower registers may be increased also by speeding up the rate of travel of the film. This variation of speed provides a desirable method of modulating suspended notes of any character which may be obtained by varying the angularity of the sound track elements to provide a suspended sound component or series of components.

Referring more specifically to the drawing there is shown in Fig. 1, a motion picture film, designated by the numeral 10 and having a sound track area 11, of standard dimensions.

In Fig. 2 the sound track area remains the same for any given size of film, but due to the angularity of the component elements 13, they are appreciably increased over the corresponding elements 14 of the standard horizontal track, so that an appreciable increase in the effect of track width, as indicated generally by the numeral 15, is secured.

Referring more specifically to Fig. 3, there is shown a plurality of right triangles having a common base 20.

By superposing on this common base 3, right triangles making 30, 40 and 60 degree angles with the base respectively, it will be seen that the hypotenuses of the several triangles are successively longer than the base. For a 45 degree angle, therefore, the increase in length of the aperture over that afforded by its strictly horizontal aperture is approximately 40 per cent.

As the angle is increased the effective length or width of the sound track is also increased until, as the angle approaches 90 degrees as a maximum the sound track element approaches infinity in length.

Referring to Figs. 4 and 5 there is shown a standard sound film having a track 30 in which the elements are of variable width, as in Fig. 4, or as in Fig. 5, the elements 31, while of variable width, are still diagonally dispersed with respect to the direction of travel of the film, and are appreciably longer than the horizontal elements.

The aperture mechanism, comprising a rotatable sheath 40, having an aperture plate 41, containing an aperture 42 of any desired dimensions, is adapted to be rotated by means of a micrometer screw adjustment 43 controlled by a suitable knob or handle 44. Such a device permits the obtaining of any desired angularity of the aperture in a single sound camera or reproducing head, and also permits various moving picture producers to effect a standard angularity for their respective films so as to permit of their ready and accurate identification. Such changes, however, are readily taken care of by the exhibitor in that by rotating the aperture mechanism to the proper angle, one is enabled to vary the motion at will and thus accommodate all types of films.

Referring now to Figs. 6 to 9 inclusive, the aperture mechanism comprises a base plate 50, slotted as indicated at 51 and provided with a lug 52 about which it is adapted to rotate on pivot 53. A pin, 54, slides in slot 55 of plate 56 which is superposed on plate 50. Plate 56 is provided with a cut-out portion 57 adapted to register with slot 51 at various positions thereof and, due to its shape, to provide a maximum aperture. This is secured as will be noted by making a bottom portion 58 of the slot 57 much wider than the top portion 59, so that the slot 57 tapers from the top to the bottom as shown.

It will be appreciated that the present invention may be applied to existing sound cameras and recording and reproducing systems generally merely by partially rotating the telescope containing the aperture. The present invention is adapted for use in all types of film, including the standard 35 millimeter size, as well as the wider 50 and 70 mm. width.

It is of particular interest in that it can be used for 16 millimeter film so that the recording and reproducing powers of the latter are rendered the full equivalents of the wider films. This can be readily appreciated due to the fact that with the narrower width of sound track area available on a 16 mm. film, the range of sound reproducing and recording is appreciably diminished. By the use of the present invention this effective sound track width is increased up to 40 per cent or greater without requiring any increase in sound track area width and while, at the same time increasing the clarity and effectiveness of the reproduced sound due to the greater amount of light energy permitted to be projected on to the photo electric cell. A 16 millimeter film having improved sound track according to the concepts of the present invention will thus be equal in sound characteristics to the normal 35 millimeter film having the use of standard sound track.

By varying the speed of the various types of films, substantially uniform results can be secured in sound recording and reproduction with any of the usual types of apparatus now available for the work.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In sound recording apparatus an improved aperture mechanism comprising a plate having a central transverse aperture extending across the major portion of the width of the plate, an apertured lug formed at one side of said plate adapted to serve as a pivot therefor and thereby to determine the angular position of the aperture, and a second plate adjustably superposed on said first plate, said second plate being formed with a slanting recess of progressive width adapted to determine the position and extent of the effective aperture in the first said plate.

2. In a sound recording apparatus an improved aperture mechanism comprising two superposed plates, one of said plates having a transverse opening, the other of said plates having an opening diagonally thereof, the plates being adjustably mounted whereby the effective aperture may be varied.

3. In a sound recording apparatus an improved aperture mechanism comprising two superposed plates, one of said plates having a transverse opening and being adapted to be rotated whereby to vary the angular position of the said transverse opening, the other of said plates having an opening diagonally thereof, the plates being adjustably mounted whereby the effective aperture may be varied.

4. In a sound recording apparatus, an improved aperture mechanism comprising two superposed plates, one of said plates having a transverse opening and a lug formed on a marginal edge of the plate, the other of said plates having a channelled opening diagonally thereof, the plates being adjustably mounted whereby the effective aperture may be varied, and means comprising a slot in said second plate parallel to the longitudinal edge thereof, and a pin in said first plate passing through said slot, said pin and slot being adapted to permit longitudinal movement of the second plate with respect to said first plate.

5. In a sound recording apparatus, an improved aperture mechanism comprising two superposed plates, one of said plates having a transverse opening, the other of said plates having an opening diagonally thereof, the plates being adjustably mounted whereby the effective aperture may be laterally varied.

6. In a sound recording apparatus, an improved aperture mechanism comprising two superposed plates, one of said plates having a transverse opening and a lug formed on a marginal edge of the plate, the other of said plates having a channelled opening diagonally thereof, the plates being adjustably mounted whereby the effective aperture may be laterally varied, and means comprising a slot in said second plate parallel to the longitudinal edge thereof, and a pin in said first plate passing through said slot, said pin and slot being adapted to permit longitudinal movement of the second plate with respect to said first plate.

In testimony whereof I have hereunto set my hand.

JAY CLEIS KROESEN.